(12) United States Patent
Zeira

(10) Patent No.: US 7,170,926 B2
(45) Date of Patent: Jan. 30, 2007

(54) EFFICIENT MULTIPLE INPUT MULTIPLE OUTPUT SYSTEM FOR MULTI-PATH FADING CHANNELS

(75) Inventor: Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 778 days.

(21) Appl. No.: 10/305,533

(22) Filed: Nov. 27, 2002

(65) Prior Publication Data

US 2003/0125090 A1    Jul. 3, 2003

Related U.S. Application Data

(60) Provisional application No. 60/334,246, filed on Nov. 29, 2001.

(51) Int. Cl.
*H04B 1/69* (2006.01)

(52) U.S. Cl. ............... 375/148; 375/299; 375/347; 370/210

(58) Field of Classification Search ............... 375/146, 375/147, 148, 150, 260, 267, 299, 347, 130, 375/140, 295, 316; 370/203, 210; 342/175, 342/195, 196; 702/1, 57, 66, 75, 77; 708/100, 708/200, 400, 403, 404, 405; 379/406.01, 379/406.13
See application file for complete search history.

(56) References Cited

U.S. PATENT DOCUMENTS

| | | | |
|---|---|---|---|
| 5,550,810 A | | 8/1996 | Monogioudis et al. |
| 6,122,269 A | * | 9/2000 | Wales .................. 370/338 |
| 6,175,588 B1 | * | 1/2001 | Visotsky et al. ........... 375/148 |
| 6,473,467 B1 | | 10/2002 | Wallace et al. |
| 2002/0154705 A1 | * | 10/2002 | Walton et al. ............... 375/267 |
| 2002/0165626 A1 | | 11/2002 | Hammons, Jr. et al. |
| 2002/0177447 A1 | | 11/2002 | Walton et al. |
| 2003/0123384 A1 | * | 7/2003 | Agee ..................... 370/208 |
| 2005/0025267 A1 | * | 2/2005 | Reznik et al. ............. 375/346 |
| 2005/0111599 A1 | * | 5/2005 | Walton et al. ............. 375/347 |

FOREIGN PATENT DOCUMENTS

| | | |
|---|---|---|
| EP | 1 179 893 | 2/2002 |
| JP | 13-267991 | 9/2001 |
| KR | 0322141 | 10/2001 |

* cited by examiner

*Primary Examiner*—Pankaj Kumar
*Assistant Examiner*—Naheed Ejaz
(74) *Attorney, Agent, or Firm*—Volpe and Koenig, P.C.

(57) ABSTRACT

Data is transferred in a wireless communication system, such as a wireless spread spectrum communication system. Data is encoded to produce a plurality of data streams. For each of a plurality of transmitting antennas, the data streams are used to produce a vector for transmission. Each transmission vector is transmitted by its transmitting antenna through a wireless air interface experiencing multipath. Multipath components from each transmitted transmission vector are received by a plurality of receiving antennas. The received multiplath components are equalized to recover the transmission vectors. The data is recovered from the recovered transmission vectors.

28 Claims, 5 Drawing Sheets

MIMO Channel Equalizing Device 44A

US 7,170,926 B2

EFFICIENT MULTIPLE INPUT MULTIPLE OUTPUT SYSTEM FOR MULTI-PATH FADING CHANNELS

CROSS REFERENCE TO RELATED APPLICATION(S)

This application claims priority from U.S. provisional application No. 60/334,246, filed Nov. 29, 2001, which is incorporated by reference as if fully set forth.

FIELD OF INVENTION

This invention relates generally to wireless communication systems. In particular, the invention relates to transferring signals using antenna arrays.

BACKGROUND

A multiple input multiple output (MIMO) system is described in FIG. 1. Multiple transmission and/or reception antennas $12_1$ to $12_M$ (12), $16_1$ to $16_N$ (16) are used to transfer the communication. Each antenna 12, 16 is spatially separated from the other antennas 12, 16. A transmitter 10 using its antenna array 12 transmits a communication to a receiver 18 through a wireless air interface 14. The receiver 18 receives the communication using its antenna array 16. Using both multiple transmission and reception antennas 12, 16 is referred to as multiple input multiple output (MIMO) processing.

Typically, MIMO processing employs multiple antennas at both the base station transmitter and user equipment receiver. While the deployment of base station antenna arrays is already commonly used in wireless communication systems, the simultaneous deployment of base station and user equipment arrays enable significant increases in capacity and data rates by opening up multiple signaling dimensions.

Available MIMO algorithms address a single-path fading channels. However, wireless communication systems are characterized by multipath fading channels. Algorithms that are designed for single-path fading channels, typically exhibit severe degradation in presence of multipath.

Accordingly, it is desirable to have other MIMO systems.

SUMMARY

Data is transferred in a wireless communication system, such as a wireless spread spectrum communication system. Data is encoded to produce a plurality of data streams. For each of a plurality of transmitting antennas, the data streams are used to produce a vector for transmission. Each transmission vector is transmitted by its transmitting antenna through a wireless air interface experiencing multipath. Multipath components from each transmitted transmission vector are received by a plurality of receiving antennas. The received multiplath components are equalized to recover the transmission vectors. The data is recovered from the recovered transmission vectors.

BRIEF DESCRIPTION OF THE DRAWING(S)

DETAILED DESCRIPTION OF THE PREFERRED EMBODIMENT(S)

Figure 1:
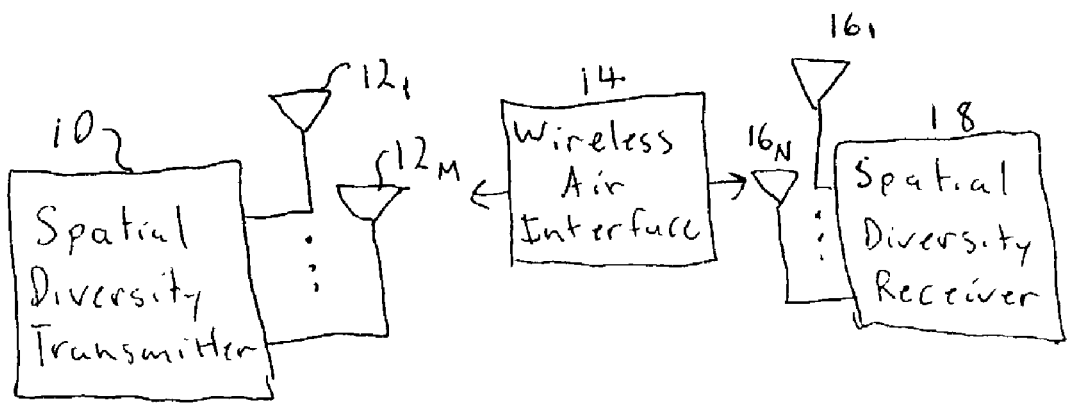
FIG. 1 is an illustration of a transmitter and a receiver using multiple antennas.
Figure 2:
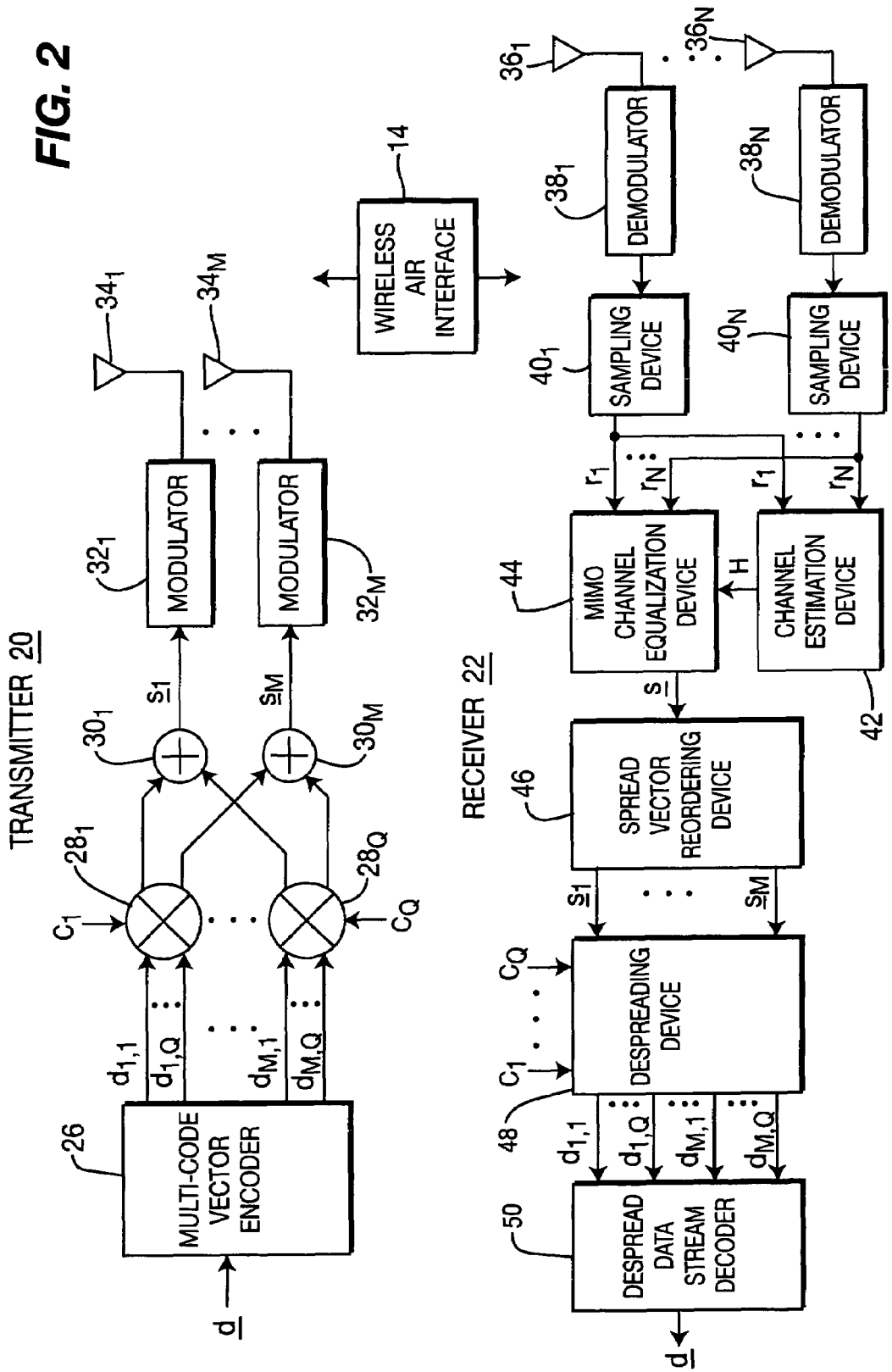
FIG. 2 is a simplified block diagram of a preferred MIMO transmitter and receiver.

FIG. 2 is a simplified block diagram of a multiple input multiple output (MIMO) transmitter and receiver system. The transmitter 20 can be used in a user equipment, a base station or both and the receiver 22 may be used in a base station, a user equipment or both. The MIMO system preferably uses a code division multiple access (CDMA) air interface as shown in FIG. 2, such as a frequency division duplex (FDD)/CDMA, time division duplex (TDD)/CDMA or time division synchronous code division multiple access (TD-SCDMA) air interface, although other air interfaces may be used.

A data vector d is to be transmitted through the wireless air interface by the transmitter 20. The transmitter 20 has M antennas $34_1$ to $34_M$ (34) in the antenna array. If transmission spatial diversity is not used, M is one, (a single antenna). The antennas 34 are spatially separated so that a low correlation between their received signals is obtained. For use at a base station transmitter having an angle spread in the range of 1 to 10 degrees, the antenna separation is preferably several wavelengths, such as four wavelengths. For use at a UE receiver, since the angle spread tends to be large, a smaller separation may be used, such as half a wavelength. Based on the implementation, the spatial separations may have other values.

For a preferred implementation of transferring a multi-code transmission as illustrated in FIG. 2, the data vector d to be transmitted by the M antennas 34 is encoded by a multicode vector encoder 26. For each of the Q spreading codes $C_1$ to $C_Q$, the data is split into M separate data streams $d_{1,1}$ to $d_{M,Q}$ prior to spreading. The total number of produced data streams is M·Q. To illustrate for $C_1$, data streams $d_{1,1}$ to $d_{m,1}$ are produced. Each of the M streams is associated with an antenna 34.

For each code, the data streams are spread by their code using a corresponding spreading device $28_1$ to $28_Q$ (28), such as a mixer. The spread data streams associated with the same antenna 34 are input into a combiner $30_1$ to $30_M$ (30), such as an adder, associated with that antenna 34 of the M antennas 34, producing M spread data vectors, $s_1$ to $s_M$. Each combined spread data vector, $s_1$ to $s_M$, is modulated to radio frequency by a modulator $32_1$ to $32_M$ (32) and radiated by its associated antenna 34 through the wireless air interface 14.

The preferred multicode receiver implementation as shown in FIG. 2 is for use when all of the multicode transmissions experience the same channel response with respect to a transmission and reception antenna pair. This typically occurs in the downlink. Alternately in the uplink, the receiver 22 of FIG. 2 can be used to process a single user's transmissions, when multiple users are transmitting. The other user transmissions are treated as noise.

At the receiver 22, each transmission antenna's radiated signal is received by each of the N reception antennas $36_1$ to $36_N$, as a combined received signal. If reception spatial diversity is not used, N is one, (a single antenna). N is preferably equal to or greater than M. Each received antenna's signal is demodulated to baseband by a demodulator $38_1$ to $38_N$ (38). Each demodulated signal is sampled, such as at the chip rate or a multiple of the chip rate, by a sampling device $40_1$ to $40_N$ (40), to produce a received vector for each antenna 36, $r_1$ to $r_N$. The combined received vector r comprises $r_1$ to $r_N$.

The combined received vector r is input into a MIMO channel equalization device 44. A training sequence signal r' is input into a channel estimation device 42. The channel estimation device 42 estimates the channel response for each reception and transmission antenna combination. For an $i^{th}$ receiving antenna 36 and a $j^{th}$ transmitting antenna 34, the channel response as a $k^{th}$ instant in time is $h_{i,j}(k)$. The overall channel response for all antenna combinations at the $k^{th}$ instant of time is per Equation 1A.

$$H(k) = \begin{bmatrix} h_{1,1}(k) & \cdots & h_{1,M}(k) \\ \vdots & \vdots & \vdots \\ h_{N,1}(k) & \cdots & h_{N,M}(k) \end{bmatrix} \quad \text{Equation 1A}$$

The overall channel response is per Equation 1B.

$$H = \begin{bmatrix} H(0) & 0 & 0 & 0 & 0 & 0 & 0 & 0 & 0 \\ H(1) & H(0) & 0 & 0 & 0 & 0 & 0 & 0 & 0 \\ H(2) & H(1) & H(0) & 0 & 0 & 0 & 0 & 0 & 0 \\ \vdots & \vdots & \vdots & \vdots & \vdots & \vdots & \vdots & \vdots & \vdots \\ H(L-1) & H(L-2) & H(L-3) & \cdots & \cdots & H(0) & 0 & \cdots & 0 \\ \vdots & \vdots & \vdots & \vdots & \vdots & \vdots & \vdots & \vdots & \vdots \\ 0 & 0 & \cdots & 0 & H(L-1) & \cdots & \cdots & \cdots & H(0) \\ 0 & 0 & 0 & \cdots & 0 & H(L-1) & \cdots & \cdots & H(1) \\ \vdots & \vdots & \vdots & \vdots & \vdots & \vdots & \vdots & \vdots & \vdots \\ 0 & 0 & 0 & 0 & 0 & 0 & \cdots & 0 & H(L-1) \end{bmatrix} \quad \text{Equation 1B}$$

The overall channel response H is passed to the MIMO channel equalization device 44. The MIMO channel equalization device 44 uses the channel response matrix H and equalizes the received vector r to compensate for the channel distortion experienced through the wireless air interface 24, producing a spread data vector s. The spread data vector s is reordered by a spread vector reordering device 46 so that each transmitting antenna's spread data vector $s_1$ to $s_M$ is recovered. Each transmitting antenna's spread data vector $s_1$ to $s_M$ is despread by a despreading device 48 using the spreading codes, $C_1$ to $C_Q$, to estimate data for each of the M encoded data streams for each antenna, $d_{1,1}$ to $d_{M,Q}$. A despread data stream decoder 50 combines the data streams $d_{1,1}$ to $d_{M,Q}$ to recover the original data vector d.

Each communication transferred by a particular transmission/reception antenna combination experiences a different multi-path environment than the other transmission/reception antenna combinations, due to the spatial diversity. By processing the received multi-path components of all of the reception antennas $36_1$ to $36_N$, the capacity and maximum data rate of the system is significantly increased.

Figure 3A:
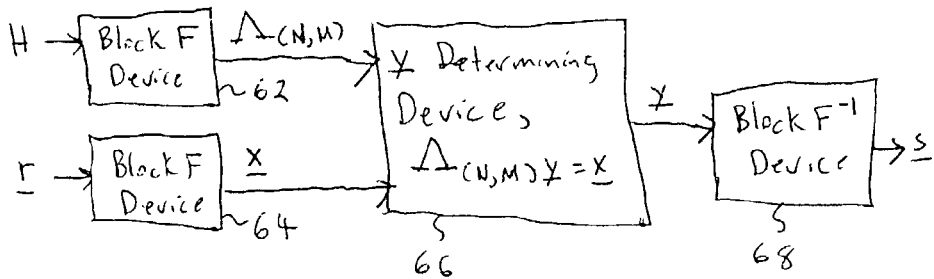
FIG. 3A is an embodiment of a MIMO channel equalization device.
Figure 3B:
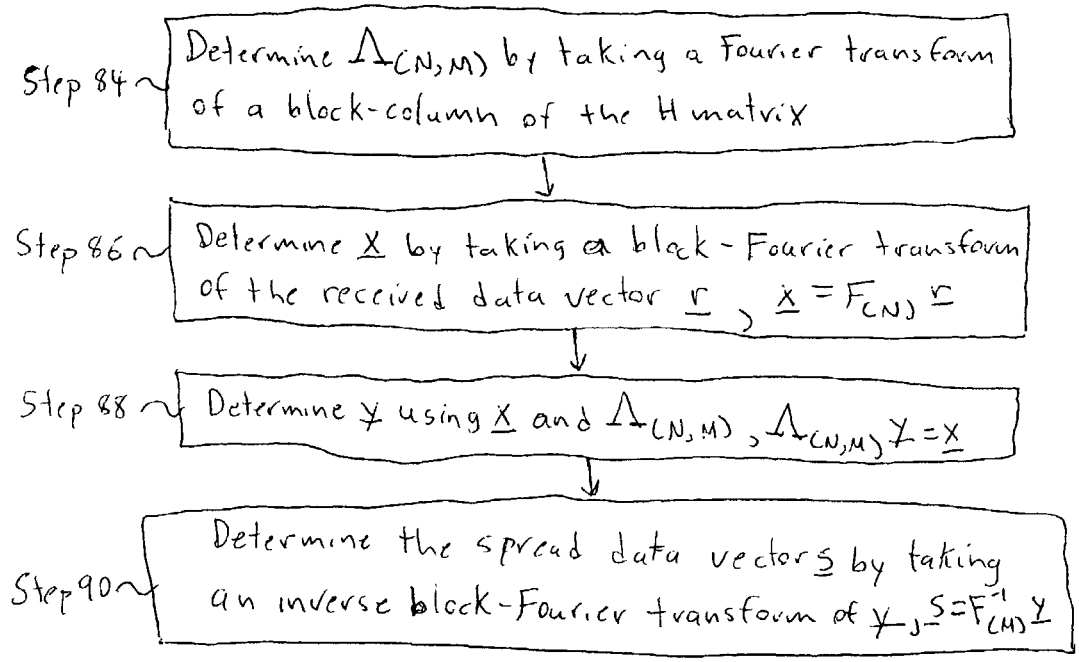
FIG. 3B is a flow chart of a MIMO channel equalization embodiment.

FIG. 3A is an embodiment of a MIMO channel equalization device 44 and FIG. 3B is a flow chart of a MIMO channel equalization embodiment. Other embodiments for a MIMO channel equalization device, such as Cholesky or approximate Cholesky decomposition, can also be used. The received samples of the channel impulse responses for each antenna pair are per Equation 2.

$$h_{ij}(k), \text{ where } k=0, \ldots, L-1 \quad \text{Equation 2}$$

i is the $i^{th}$ receiving antenna. j is the $j^{th}$ transmitting antenna. k is the $k^{th}$ sample of the impulse response of length L. The channel impulse response of all reception and transmission antenna pairings for the $k^{th}$ sample is per Equation 3.

$$H(k) = \begin{bmatrix} h_{1,1}(k) & \cdots & h_{1,M}(k) \\ \vdots & \vdots & \vdots \\ h_{N,1}(k) & \cdots & h_{N,M}(k) \end{bmatrix} \quad \text{Equation 3}$$

The transmitted spread data vector s has $N_s \cdot M$ dimension vectors s(k). $N_s$ is the number of transmitted data symbols. The overall received vector r has $N_s+L-2$ received vectors of dimension N and is per Equation 4.

$$\begin{bmatrix} r(0) \\ r(1) \\ r(2) \\ \vdots \\ r(N_s+L-2) \end{bmatrix} = \begin{bmatrix} H(0) & 0 & 0 & 0 & 0 & 0 & 0 & 0 & 0 \\ H(1) & H(0) & 0 & 0 & 0 & 0 & 0 & 0 & 0 \\ H(2) & H(1) & H(0) & 0 & 0 & 0 & 0 & 0 & 0 \\ \vdots & \vdots & \vdots & \vdots & \vdots & \vdots & \vdots & \vdots & \vdots \\ H(L-1) & H(L-2) & H(L-3) & \cdots & \cdots & H(0) & 0 & \cdots & 0 \\ \vdots & \vdots & \vdots & \vdots & \vdots & \vdots & \vdots & \vdots & \vdots \\ 0 & 0 & \cdots & 0 & H(L-1) & \cdots & \cdots & \cdots & H(0) \\ 0 & 0 & 0 & \cdots & 0 & H(L-1) & \cdots & \cdots & H(1) \\ \vdots & \vdots & \vdots & \vdots & \vdots & \vdots & \vdots & \vdots & \vdots \\ 0 & 0 & 0 & 0 & 0 & 0 & \cdots & 0 & H(L-1) \end{bmatrix} \begin{bmatrix} s(0) \\ s(1) \\ s(2) \\ \vdots \\ s(L-1) \\ \vdots \\ s(N_s-1) \end{bmatrix} + w \quad \text{Equation 4}$$

w is the noise vector. Alternately, Equation 4 can be written as Equation 5.

$$r = Hs + w \qquad \text{Equation 5}$$

The r and w vectors have a length of $(N_s+L-1) \cdot N$. The s vector has a length of $N_s M$ and H is a $(N_s+L-1) \cdot N$ by $N_s \cdot M$ matrix.

As shown in Equation 4, the H matrix is approximately block circulant. To make the H matrix more block circulant, L−1 block columns are added to the H matrix, to produce an extended H matrix, and a corresponding number of zeros added to the s vector, to produce an extended s vector. The L−1 column blocks are added in accordance with the H matrice's block circulant structure. After the extending of the H matrix and the s vector, the extended H matrix has a dimension of $(N_s+L-1) \cdot N$ by $(N_s+L-1) \cdot M$ and s has a length of $(N_s+L-1) \cdot M$.

For shorthand, $N_s+L-1$ is represented by D, so that $D = N_s+L-1$. The extended H matrix of size DN by DM with blocks of size N by M is decomposed per Equation 6.

$$H_{(N,M)} = F_{(N)}^{-1} \Lambda_{(N,M)} F_{(M)} \qquad \text{Equation 6}$$

$F_{(N)}$ is a block Fourier transform with a block size of N by N and $F_{(M)}$ is a block Fourier transform with a block size of M by M. $F_{(N)}$ is per Equation 7.

$$F_{(N)} = F \otimes I_N \qquad \text{Equation 7}$$

$\otimes$ is the Kronecker product operation and $I_N$ is an N by N identity matrix.

$F_{(M)}$ is per Equation 8.

$$F_{(M)} = F \otimes I_M \qquad \text{Equation 8}$$

$I_M$ is an M by M identity matrix.

The block-diagonal matrix $\Lambda_{(N,M)}$ is, preferably, a block-Fourier transform of the first block-column of H, although another column may be used, (after being permuted), step 84. A block-Fourier transform device 62 produces $\Lambda_{(N,M)}$ by taking a block-transform of a column of H. $\Lambda_{(N,M)}$ is preferably derived from Equation 9.

$$\text{diag}_{(N,M)}(\Lambda_{(N,M)}) = F_{(N)} H_{(N,M)}(:,1:M) \qquad \text{Equation 9}$$

$\text{diag}_{(N,M)}(\Lambda_{(N,M)})$ is the block diagonal of $\Lambda_{(N,M)}$. (:,1: M) represents the first block column of width M. By using a single block column of H to derive $\Lambda_{(N,M)}$, the H matrix is approximated as being a block circulant matrix.

By substituting Equation 6 into Equation 2, Equation 10 results.

$$\Lambda_{(N,M)} F_{(M)} s = F_{(N)} r \qquad \text{Equation 10}$$

To solve for s, initially, a vector x is determined per Equation 11, step 86.

$$x = F_{(N)} r \qquad \text{Equation 11}$$

x is preferably determined by an N non-block discrete Fourier transform of length D. A block-Fourier transform device 64 produces x by taking the block-transform of r.

Subsequently, a vector y is determined per Equation 12, step 88.

$$\Lambda_{(N,M)} y = x \qquad \text{Equation 12}$$

A y determining device 66 produces y.

Since $\Lambda_{(N,M)}$ is a block diagonal matrix, y is preferably determined on a block-by-block basis by solving D systems of equations of smaller size, such as per Equation 13.

$$\Lambda_{(N,M)}^i y_i = x_i \; i=1, \ldots D \qquad \text{Equation 13}$$

$\Lambda_{(N,M)}^i$ is the $i^{th}$ block of $\Lambda_{(N,M)}$. $y_i$ is the $i^{th}$ M by 1 sub-vector of y. $x_i$ is the $i^{th}$ N by 1 sub-vector of x.

Since $\Lambda_{(N,M)}^i$ is unstructured, one approach to solve Equation 13 is to use Cholesky decomposition of Equation 14 and forward and backward substitution, although other approaches may be used.

$$(\Lambda_{(N,M)}^i)^H \Lambda_{(N,M)}^i \qquad \text{Equation 14}$$

If the number of receiving antennas N is equal to the number of transmitting antennas, $\Lambda_{(N,M)}^i$ is a square matrix and y can be determined by inverting $\Lambda_{(N,M)}^i$. For small values of N, a matrix inversion may be more efficient than performing a Cholesky decomposition.

The s vector is determined per Equation 15, step 90.

$$s = F_{(M)}^{-1} y \qquad \text{Equation 15}$$

A block inverse Fourier transform device 68 is used to produce s. One approach to determining s using Equation 15 is by performing M non-block inverse discrete Fourier transforms of dimension D, although other approaches may be used.

Figure 4A:
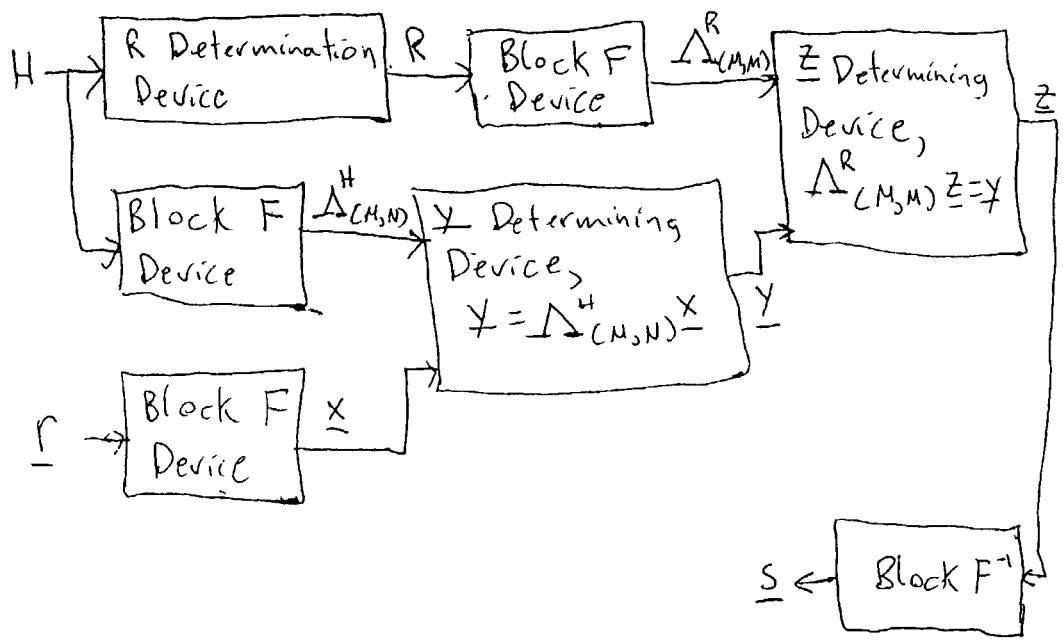
FIG. 4A is an alternate embodiment of a MIMO channel equalization device.
Figure 4B:
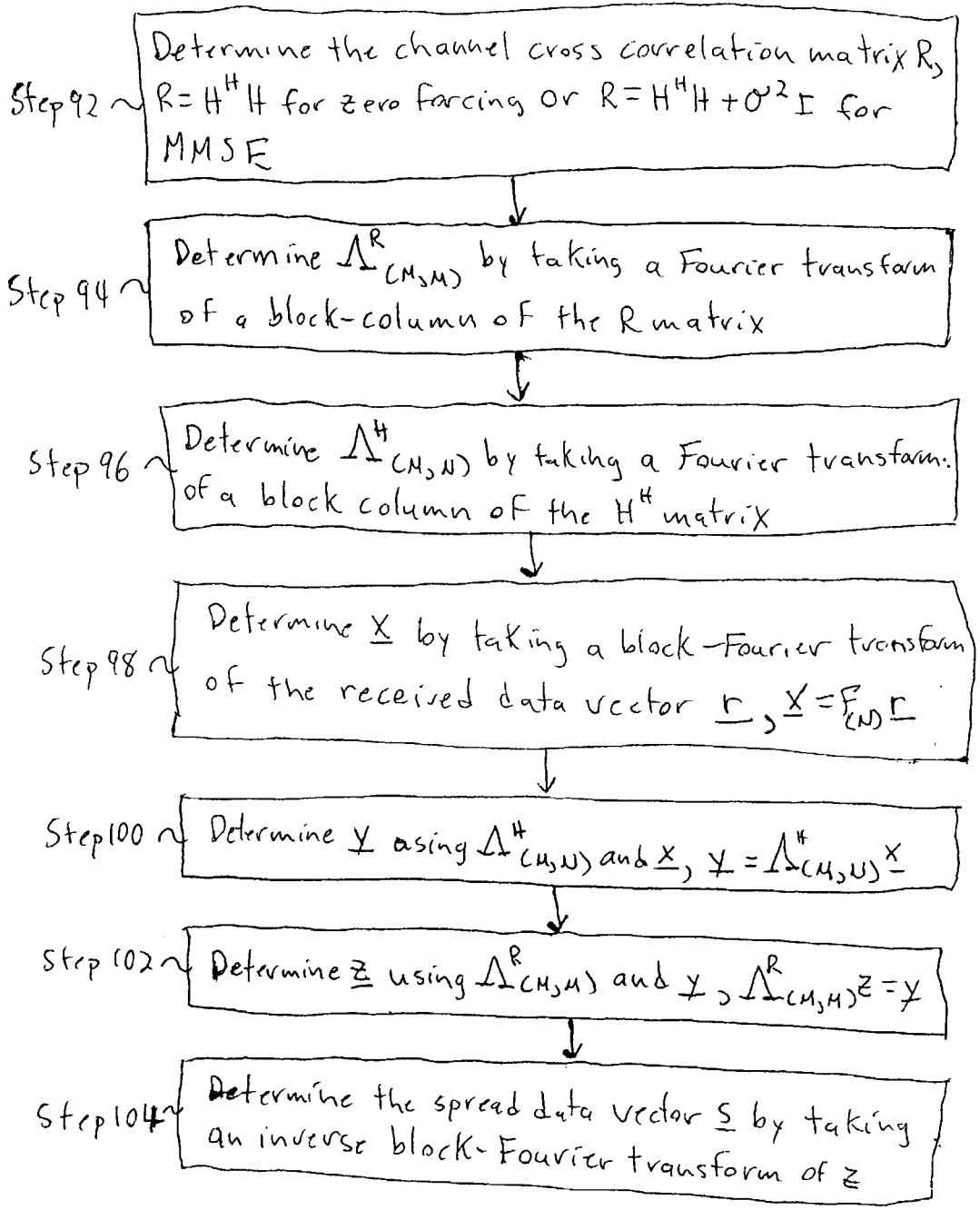
FIG. 4B is a flow chart of a MIMO channel equalization alternate embodiment.

FIG. 4A is an alternate embodiment of a MIMO channel equalization device 44B and FIG. 4B is a flow chart of the MIMO channel equalization alternate embodiment. To determine s, both sides of Equation 2 are multiplied by $H^H$, per Equation 16.

$$H^H r = Rs + H^H w = Rs + n \qquad \text{Equation 16}$$

$(\cdot)^H$ is the conjugate transpose operation. n is the equalized noise vector. R is the channel cross correlation matrix and is determined by an R determination device 70 using the H matrix, step 92. R for a zero forcing solution is per Equation 17.

$$R = H^H H \qquad \text{Equation 17}$$

For a minimum mean square errors (MMSE) solution, R is per Equation 18.

$$R = H^H H + \sigma^2 I \qquad \text{Equation 18}$$

$\sigma^2$ is the variance of the noise vector w and I is an identity matrix.

The channel cross correlation matrix R has a structure per Equation 19.

$$R = \begin{bmatrix} R_0 & R_1 & R_2 & R_3 & \cdots & R_{L-1} & 0 & 0 & 0 & 0 & 0 & 0 \\ R_1^H & R_0 & R_1 & R_2 & R_3 & \cdots & R_{L-1} & 0 & 0 & 0 & 0 & 0 \\ R_2^H & R_1^H & R_0 & R_1 & R_2 & R_3 & \cdots & R_{L-1} & 0 & 0 & 0 & 0 \\ R_3^H & R_2^H & R_1^H & R_0 & R_1 & R_2 & R_3 & \cdots & R_{L-1} & 0 & 0 & 0 \\ \vdots & R_3^H & R_2^H & R_1^H & R_0 & R_1 & R_2 & R_3 & \cdots & R_{L-1} & 0 & 0 \\ R_{L-1}^H & \vdots & R_3^H & R_2^H & R_1^H & R_0 & R_1 & R_2 & R_3 & \cdots & R_{L-1} & 0 \\ 0 & R_{L-1}^H & \vdots & R_3^H & R_2^H & R_1^H & R_0 & R_1 & R_2 & R_3 & \cdots & R_{L-1} \\ 0 & 0 & R_{L-1}^H & \vdots & R_3^H & R_2^H & R_1^H & R_0 & R_1 & R_2 & R_3 & \cdots \\ 0 & 0 & 0 & R_{L-1}^H & \vdots & R_3^H & R_2^H & R_1^H & R_0 & R_1 & R_2 & R_3 \\ 0 & 0 & 0 & 0 & R_{L-1}^H & \vdots & R_3^H & R_2^H & R_1^H & R_0 & R_1 & R_2 \\ 0 & 0 & 0 & 0 & 0 & R_{L-1}^H & \vdots & R_3^H & R_2^H & R_1^H & R_0 & R_1 \\ 0 & 0 & 0 & 0 & 0 & 0 & R_{L-1}^H & \vdots & R_3^H & R_2^H & R_1^H & R_0 \end{bmatrix} \quad \text{Equation 19}$$

After the adding of L−1 columns to the H matrix as previously described, a close to block circulant approximation of the R matrix can be derived, referred to as the extended R matrix. The dimensions of the extended R matrix are DM by DM.

Using the extended R matrix, Equation 20 is used to determine s.

$$H^H r = R s \quad \text{Equation 20}$$

By approximating R and $H^H$ as block circulant matrices, R is decomposed per Equation 21.

$$R = F_{(M)}^{-1} \Lambda_{(M,M)}^R F_{(M)} \quad \text{Equation 21}$$

$\Lambda_{(M,M)}^R$ is preferably derived from a first block column of R per Equation 22, although another column may be used, (after being permutated), step 94.

$$\text{diag}_{(M,M)}(\Lambda_{(M,M)}^R) = F_{(M)} R_{(M,M)}(:,1:M) \quad \text{Equation 22}$$

$\text{diag}_{(M,M)}(\Lambda_{(M,M)}^R)$ is the block diagonal of $\Lambda_{(M,M)}^R$. A block-Fourier transform device 72 is used to determine $\Lambda^{(M,M)R}$ by taking a block-Fourier transform of a block column of R.

$H^H$ is decomposed per Equation 23.

$$H^H = F_{(M)}^{-1} \Lambda_{(M,N)}^H F_{(N)} \quad \text{Equation 23}$$

$\Lambda_{(M,N)}^H$ is preferably determined using the first block column of $H^H$ per Equation 24, although another block column may be used, (after being permuted), step 96.

$$\text{diag}_{(M,N)}(\Lambda_{(M,N)}^H) = F_{(M)} H_{(M,N)}^H(:,1:N) \quad \text{Equation 24}$$

$\text{diag}_{(M,N)}(\Lambda_{(M,N)}^H)$ is the block diagonal of $\Lambda_{(M,N)}^H$.

A block-Fourier transform device 74 is used to determine $\Lambda_{(M,N)}^H$ by taking a block-Fourier transform of a block-column of $H^H$.

By substituting 21 and 23 into 20, Equation 25 results.

$$\Lambda_{(M,N)}^H F_{(N)} r = \Lambda_{(M,M)}^R F_{(M)} s \quad \text{Equation 25}$$

Solving for s, Equation 26 results.

$$s = F_{(M)}^{-1} (\Lambda_{(M,M)}^R)^{-1} \Lambda_{(M,N)}^H F_{(N)} r \quad \text{Equation 26}$$

Determining s is preferably performed in a four step process. Initially, x is determined per Equation 27, step 98.

$$x = F_{(N)} r \quad \text{Equation 27}$$

The block-Fourier transform is preferably performed by an N non-block Fourier transform of length D. A block-Fourier transform device 76 takes a block-Fourier transform of r to determine x.

In a second step, y is determined per Equation 28, step 100.

$$y = \Lambda_{(M,N)}^H x \quad \text{Equation 28}$$

A y determining device 78 uses $\Lambda_{(M,N)}^H$ and x to determine y.

In a third step, z is determined per Equation 29, step 102.

$$\Lambda_{(M,M)}^R z = y \quad \text{Equation 29}$$

A z determining device 80 determines z using $\Lambda_{(M,M)}^R$ and y.

Preferably, since $\Lambda_{(M,M)}^R$ is a block diagonal matrix, Equation 29 is solved using D systems of smaller size per Equation 30.

$$(\Lambda_{(M,M)}^R)^i z_i = y_i \; i=1,\ldots,D \quad \text{Equation 30}$$

$(\Lambda_{(M,M)}^R)^i$ is the $i^{th}$ block of $\Lambda_{(M,M)}^R$. $z_i$ is the $i^{th}$ M by 1 sub-vector of z. $y_i$ the $i^{th}$ M by 1 sub-vector of y.

Since $(\Lambda_{(M,M)}^R)^i$ is unstructured, one approach to determine $(\Lambda_{(M,M)}^R)^i$ is to use Cholesky decomposition of $((\Lambda_{(N,M)}^R)^i)^H (\Lambda_{(M,M)}^R)^i$ and forward and backward substitution, although other approaches may be used.

In the fourth step, s is determined per Equation 31 by performing an M non-block inverse discrete Fourier transform of dimension D, step 104.

$$s = F_{(M)}^{-1} z \quad \text{Equation 31}$$

A block-inverse Fourier transform device 82 is used to take an inverse block transform of z to produce s.

To recover data from the estimated spread data vector s using either embodiment, the spread data vector s is separated into its M transmitted data streams, $s_m$ where m=1, ..., M, by the spread vector reordering device. The spread data vector s is the result of concatenating the data stream vectors $s_m$ and reordering by grouping the same chip intervals together, as per Equation 32.

$$s = \begin{bmatrix} s_{1,1} \\ \vdots \\ s_{M,1} \\ \vdots \\ s_{1,N_c} \\ \vdots \\ s_{M,N_c} \end{bmatrix} \quad \text{Equation 32}$$

$s_{m,j}$ denotes the $j^{th}$ chip interval of the $m^{th}$ data stream.

To recover each spread data vector stream $s_m$, the chips of the estimated spread data vector s are reordered per Equation 33, producing $s_{REORDERED}$.

$$s_{REODERED} = \begin{bmatrix} s_{1,1} \\ \vdots \\ s_{1,N_c} \\ \vdots \\ s_{M,1} \\ \vdots \\ s_{M,N_c} \end{bmatrix} = \begin{bmatrix} s_1 \\ \vdots \\ s_M \end{bmatrix} \quad \text{Equation 33}$$

Each of these data stream spread data vectors $s_m$ is despread by the corresponding spreading codes, $C_1$ to $C_Q$, to estimate the symbols of that data stream by the despreading device 48. The estimated symbols for each data stream are decoded by the despread data stream decoder 50 to recover the original data d.

What is claimed is:

1. A method for recovering data transmitted from a plurality of transmitting antennas and received by a plurality of receiving antennas, the method comprising:
   receiving a signal at each of the receiving antennas;
   sampling each received antenna signal to produce a combined received signal;
   estimating an overall channel response comprising a channel response for each transmitting and receiving antenna combination;
   producing a diagonal matrix using a block-column of the overall channel response;
   taking a block-Fourier transform of the combined received signal;
   producing a Fourier transform of a spread data vector using the diagonal matrix and the block-Fourier transform of the combined received signal;
   producing the spread data vector using the Fourier transform of the spread data vector; and
   despreading the spread data vector to recover the transmitted data.

2. The method of claim 1 wherein using the block-column of the overall channel response matrix comprises taking a block-Fourier transform of the block-column.

3. The method of claim 1 wherein using the combined received signal comprises taking a plurality of non-block discrete Fourier transforms.

4. The method of claim 1 wherein the using the diagonal matrix and the block-Fourier transform of the combined received signal uses Cholesky decomposition.

5. The method of claim 1 wherein the using the diagonal matrix and the block Fourier transform of the combined received signal uses a matrix inversion of blocks of the diagonal matrix.

6. The method of claim 1 wherein using the Fourier transform of the spread data vector comprises taking a block inverse Fourier transform of the Fourier transform of the spread data vector.

7. A method for recovering data transmitted from a plurality of transmitting antennas and received by a plurality of receiving antennas, the method comprising:
   receiving a signal at each of the receiving antennas;
   sampling each received antenna signal to produce a combined received signal;
   estimating an overall channel response comprising a channel response for each transmitting and receiving antenna combination;
   producing a cross channel correlation matrix using the overall channel response;
   producing a cross correlation diagonal matrix using a block-column of the cross channel correlation matrix;
   producing a diagonal matrix using a block-column of the overall channel response;
   taking a block-Fourier transform of the combined received signal;
   combining the channel response diagonal matrix and the effective block-Fourier transform of the combined received signal to produce a combined result;
   producing a Fourier transform of a spread data vector using the cross correlation diagonal matrix and the combined result;
   producing the spread data vector using the Fourier transform of the spread data vector; and
   despreading the spread data vector to recover the transmitted data.

8. The method of claim 7 wherein the producing the cross correlation matrix comprises multiplying the overall channel response with a conjugate transpose of the overall channel response.

9. The method of claim 7 wherein using the block-column of the cross channel correlation matrix comprises taking a block-Fourier transform of the cross channel correlation matrix block-column.

10. The method of claim 7 wherein using the combined received signal comprises taking a plurality of non-block discrete Fourier transforms.

11. The method of claim 7 wherein using the block-column of the overall channel response comprises taking a block-Fourier transform of the overall channel response block column.

12. The method of claim 7 wherein the combining of the channel response diagonal matrix and the block-Fourier transform of the combined received signal is by multiplying.

13. The method of claim 7 wherein the using the cross correlation diagonal matrix and the combined result uses Cholesky decomposition.

14. The method of claim 7 wherein using the Fourier transform of the spread data vector comprises taking a block inverse Fourier transform of the Fourier transform of the spread data vector.

15. A user equipment comprising:
   means for receiving a signal at each of a plurality of receiving antennas, each of the received signals including signals transmitted from a plurality of antennas at a single site;
   means for sampling each received antenna signal to produce a combined received signal;
   means for estimating an overall channel response comprising a channel response for each transmitting and receiving antenna combination;
   means for producing a diagonal matrix using a block-column of the overall channel response;
   means for taking a block-Fourier transform of the combined received signal;
   means for producing a Fourier transform of a spread data vector using the diagonal matrix and the block-Fourier transform of the combined received signal;
   means for producing the spread data vector using the Fourier transform of the spread data vector; and
   means for despreading the spread data vector to recover the transmitted data.

16. The user equipment of claim 15 wherein using the block-column of the overall channel response matrix comprises taking a block-Fourier transform of the block-column.

17. The user equipment of claim 15 wherein using the combined received signal comprises taking a plurality of non-block discrete Fourier transforms.

18. The user equipment of claim 15 wherein using the diagonal matrix and the effective block-Fourier transform of the combined received signal comprises using Cholesky decomposition.

19. The user equipment of claim 15 wherein using the diagonal matrix and the effective block Fourier transform of the combined received signal comprises using a matrix inversion of blocks of the diagonal matrix.

20. The user equipment of claim 15 wherein using the Fourier transform of the spread data vector comprises taking a block inverse Fourier transform of the Fourier transform of the spread data vector.

21. A user equipment comprising:

means for receiving a signal at each of a plurality of receiving antennas, each of the received signals including signals transmitted from a plurality of antennas at a single site;

means for sampling each received antenna signal to produce a combined received signal;

means for estimating a an overall channel response comprising a channel response for each transmitting and receiving antenna combination;

means for producing a cross channel correlation matrix using the overall channel response;

means for producing a cross correlation diagonal matrix using a block-column of the cross channel correlation matrix;

means for producing a channel response diagonal matrix using a block-column of the overall channel response matrix;

means for taking a block-Fourier transform of the combined received signal;

means for combining the channel response diagonal matrix and the block-Fourier transform of the combined received signal to produce a combined result;

means for producing a Fourier transform of a spread data vector using the cross correlation diagonal matrix and the combined result;

means for producing the spread data vector using the Fourier transform of the spread data vector; and means for despreading the spread data vector to recover the transmitted data.

22. The user equipment of claim 21 wherein the means for producing the cross correlation matrix multiplies the overall channel response with a conjugate transpose of the overall channel response.

23. The user equipment of claim 21 wherein using the block-column of the cross channel correlation matrix comprises taking a block-Fourier transform of the cross channel correlation matrix block-column.

24. The user equipment of claim 21 wherein for taking a block-Fourier transform of the combined received signal comprises taking a plurality of non-block discrete Fourier transforms.

25. The user equipment of claim 21 wherein using the block-column of the overall channel response comprises taking a block-Fourier transform of the overall channel response block column.

26. The user equipment of claim 21 wherein the means for combining of the channel response diagonal matrix and the block-Fourier transform of the combined received signal is performed by multiplying.

27. The user equipment of claim 21 wherein using the cross correlation diagonal matrix and the combined result uses Cholesky decomposition.

28. The user equipment of claim 21 wherein using the Fourier transform of the spread data vector comprises taking a block inverse Fourier transform of the Fourier transform of the spread data vector.

* * * * *

UNITED STATES PATENT AND TRADEMARK OFFICE
CERTIFICATE OF CORRECTION

PATENT NO. : 7,170,926 B2
APPLICATION NO. : 10/305533
DATED : January 30, 2007
INVENTOR(S) : Ariela Zeria It is certified that error appears in the above-identified patent and that said Letters Patent is hereby corrected as shown below:

IN THE SPECIFICATION

Column 1, line 21, after the word "antennas", delete "121 to 12M (12), 161 to 16N" and insert therefor --12$_1$ to 12$_M$ (12), 16$_1$ to 16$_N$--.

Column 2, line 20, after the word "vector", delete "d" and insert therefor --$\underline{d}$--.

Column 2, line 33, after the word "vector", delete "d" and insert therefor --$\underline{d}$--.

Column 2, Line 46, after the word "vectors", delete "s$_1$ to s$_M$" and insert therefor --$\underline{s}_1$ to $\underline{s}_M$--.

Column 2, line 47, after the word "vectors", delete "s$_1$ to s$_M$" and insert therefor --$\underline{s}_1$ to $\underline{s}_M$--.

Column 2, line 66, before the words "The combined", delete "r$_1$ to r$_N$" and insert therefor --$\underline{r}_1$ to $\underline{r}_N$--.

Column 2, line 67, after the word "vector", delete "r comprises r$_1$ to r$_N$" and insert therefor --$\underline{r}$ comprises $\underline{r}_1$ to $\underline{r}_N$--.

Column 3, line 1, after the word "vector", delete "r" and insert therefor --$\underline{r}$--.

Column 3, line 2, after the word "signal", delete "r'" and insert therefor --$\underline{r}'$--.

Column 3, line 39, after the word "vector", delete "r" and insert therefor --$\underline{r}$--.

Column 3, line 41, after the first use of the word "vector", delete "s" and insert therefor --$\underline{s}$--.

Column 3, line 43, after the word "vector", delete "s$_1$ to s$_M$" and insert therefor --$\underline{s}_1$ to $\underline{s}_M$--.

Column 3, line 44 & 45, after the word "vector", delete "s$_1$ to s$_M$" and insert therefor --$\underline{s}_1$ to $\underline{s}_M$--.

Column 3, line 47, after the word "antenna", delete "d$_{1,1}$ to d$_{M,Q}$" and insert therefor --$\underline{d}_{1,1}$ to $\underline{d}_{M,Q}$--.

UNITED STATES PATENT AND TRADEMARK OFFICE
CERTIFICATE OF CORRECTION

PATENT NO. : 7,170,926 B2
APPLICATION NO. : 10/305533
DATED : January 30, 2007
INVENTOR(S) : Ariela Zeria It is certified that error appears in the above-identified patent and that said Letters Patent is hereby corrected as shown below:

Column 3, line 49, before the words "to recover", delete "$d_{1,1}$ to $d_{M,Q}$" and insert therefor --$\underline{d}_{1,1}$ to $\underline{d}_{M,Q}$--.

Column 3, line 49, after the word "vector", delete "d" and insert therefor --$\underline{d}$--.

Column 4, line 46, after the word "vector", delete "s" and insert therefor --$\underline{s}$--.

Column 4, line 48, after the word "vector", delete "r" and insert therefor --$\underline{r}$--.

Column 5, line 1, before the words "is the", delete "w" and insert therefor --$\underline{w}$--.

Column 5, delete Equation 5 and insert therefor --$\underline{r}$ = H$\underline{s}$ + $\underline{w}$--.

Column 5, line 8, before the word "vectors", delete "r and w" and insert therefor --$\underline{r}$ and $\underline{w}$--.

Column 5, line 8, after ". The", delete "s" and insert therefor --$\underline{s}$--.

Column 5, line 15, after the words "to the", delete "s" and insert therefor --$\underline{s}$--.

Column 5, line 15, after the word "extended", delete "s" and insert therefor --$\underline{s}$--.

Column 5, line 17, before the word "block", delete "matrice's" and insert therefor --matrix's--.

Column 5, line 18, after the words "and the", delete "s" and insert therefor --$\underline{s}$--.

Column 5, line 19, before the words "has a", delete "s" and insert therefor --$\underline{s}$--.

Column 5, delete Equation 10, and insert therefor --$\Lambda_{(N,M)}F_{(M)}\underline{s}=F_{(N)}\underline{r}$--.

Column 5, line 60, after the word "for", delete "s" and insert therefor --$\underline{s}$--.

Column 5, line 60, after the word "vector", delete "x" and insert therefor --$\underline{x}$--.

Column 5, delete Equation 11, and insert therefor --$\underline{x}=F_{(N)}\ \underline{r}$--.

Column 5, line 65, before the words "is preferably", delete "x" and insert therefor --$\underline{x}$--.

UNITED STATES PATENT AND TRADEMARK OFFICE
CERTIFICATE OF CORRECTION

PATENT NO. : 7,170,926 B2  
APPLICATION NO. : 10/305533  
DATED : January 30, 2007  
INVENTOR(S) : Ariela Zeria Page 3 of 6

It is certified that error appears in the above-identified patent and that said Letters Patent is hereby corrected as shown below:

Column 5, line 67, before the words "by taking", delete "x" and insert therefor --$\underline{x}$--.

Column 5, line 67, after the words "block-transform of", delete "r" and insert therefor --$\underline{r}$--.

Column 6, line 1, after the word "vector", delete "y" and insert therefor --$\underline{y}$--.

Column 6, delete Equation 12 and insert therefor --$\Lambda_{(N,M)} \underline{y} = \underline{x}$--.

Column 6, delete line 6, and insert therefor --A $\underline{y}$ determining device 66 produces $\underline{y}$--.

Column 6, line 8, after the word "matrix", delete "y" and insert therefor --$\underline{y}$--.

Column 6, delete Equation 13, and insert therefor --$\Lambda_{(N,M)} \underline{y}_i = \underline{x}_i$ i=1, ..., D--.

Column 6, line 15, before the words "is the", delete "$y_i$" and insert therefor --$\underline{y}_i$--.

Column 6, line 16, after the first use of the words "sub-vector of", delete "y. $x_i$" and insert therefor --$\underline{y}$ . $\underline{x}_i$--.

Column 6, line 16, after the second use of the words "sub-vector of", delete "x" and insert therefor --$\underline{x}$--.

Column 6, line 27, before the words "can be", delete "y" and insert therefor --$\underline{y}$--.

Column 6, line 31, before the word "vector", delete "s" and insert therefor --$\underline{s}$--.

Column 6, delete Equation 15 and insert therefor --$\underline{s} = F_{(M)}^{-1} \underline{y}$--.

Column 6, line 37, after the word "produce", delete "s." and insert therefor --$\underline{s}$.--.

Column 6, line 37, after the word "determining", delete "s" and insert therefor --$\underline{s}$--.

Column 6, line 46, after the word "determine", delete "s" and insert therefor --$\underline{s}$--.

Column 6, delete Equation 16 and insert therefor --$H^H \underline{r} = R\underline{s} + H^H \underline{w} = R \underline{s} + \underline{n}$--.

Column 6, line 50, before the words "is the", delete "n" and insert therefor --$\underline{n}$--.

UNITED STATES PATENT AND TRADEMARK OFFICE
CERTIFICATE OF CORRECTION

PATENT NO. : 7,170,926 B2
APPLICATION NO. : 10/305533
DATED : January 30, 2007
INVENTOR(S) : Ariela Zeria It is certified that error appears in the above-identified patent and that said Letters Patent is hereby corrected as shown below:

Column 6, line 64, before the words "and I", delete "w" and insert therefor --$\underline{w}$--.

Column 7, line 26, after the word "determine", delete "s" and insert therefor --$\underline{s}$--.

Column 7, delete Equation 20 and insert therefor --$H^H \underline{r} = R\underline{s}$--.

Column 7, line 40, before the words "by taking", delete "$\Lambda^{(M,N)R}$" and insert therefor --$\Lambda_{(M,N)}^{R}$--.

Column 7, delete Equation 25 and insert therefor --$\Lambda_{(M,N)}^{H} F_{(N)}\underline{r} = \Lambda_{(M,N)}^{R} F_{(M)}\underline{s}$--.

Column 7, line 56, before the word "Equation", delete "s," and insert therefor --$\underline{s}$--.

Column 7, delete Equation 26, and insert therefor --$\underline{s} = F_{(M)}^{-1}(\Lambda_{(M,N)}^{R})^{-1} \Lambda_{(M,N)}^{H} F_{(N)} \underline{r}$--.

Column 7, line 60, after the word "Determining", delete "s" and insert therefor --$\underline{s}$--.

Column 7, line 61, after the word "Initially", delete "x" and insert therefor --$\underline{x}$--.

Column 7, delete Equation 27 and insert therefor --$\underline{x} = F_{(N)} \underline{r}$--.

Column 7, line 66, after the words "transform of", delete "r" and insert therefor --$\underline{r}$--.

Column 7, line 67, after the word "determine", delete "x" and insert therefor --$\underline{x}$--.

Column 8, line 20, after the word "step", delete "y" and insert therefor --$\underline{y}$--.

Column 8, delete Equation 28 and insert therefor --$\underline{y} = \Lambda_{(M,N)}^{H} \underline{x}$--.

Column 8, line 24, before the word "determining", delete "y" and insert therefor --$\underline{y}$--.

Column 8, lines 24 & 25, after the word "and", delete "x to determine y." and insert therefor --$\underline{x}$ to determine $\underline{y}$--.

Column 8, line 26, after the word "step", delete "z" and insert therefor --$\underline{z}$--.

Column 8, delete Equation 29, and insert therefor --$\Lambda_{(M,M)}^{R} \underline{z} = \underline{y}$--.

UNITED STATES PATENT AND TRADEMARK OFFICE
CERTIFICATE OF CORRECTION

PATENT NO.       : 7,170,926 B2
APPLICATION NO.  : 10/305533
DATED            : January 30, 2007
INVENTOR(S)      : Ariela Zeria It is certified that error appears in the above-identified patent and that said Letters Patent is hereby corrected as shown below:

Column 8, delete lines 30 & 31 and insert therefor --A $\underline{z}$ determining device 80 determines $\underline{z}$ using $\Lambda_{(M,N)}^{R}$ and $\underline{y}$--.

Column 8, delete Equation 30 and insert therefor --$(\Lambda_{(M,M)}^{R}) \underline{z} = \underline{y}_i$ i=1, ... ,D--.

Column 8, line 37, before the second use of the words "is the", delete "z" and insert therefor --$\underline{z}$--.

Column 8, delete line 38, and insert therefor --sub-vector of $\underline{z}$ . $\underline{y}_i$ the i$^{th}$ M by 1 sub-vector of $\underline{y}$.--.

Column 8, line 42, after the word "step", delete "s" and insert therefor --$\underline{s}$--.

Column 8, delete Equation 31 and insert therefor --$\underline{s} = F_{(M)}^{-1} \underline{z}$--.

Column 8, line 49, after the words "transform of", delete "z to produce s." and insert therefor --$\underline{z}$ to produce $\underline{s}$.--.

Column 8, line 50, after the word "vector", delete "s" and insert therefor --$\underline{s}$--.

Column 8, line 51, after the word "vector", delete "s" and insert therefor --$\underline{s}$--.

Column 8, line 52, after the word "streams", delete "$s_m$" and insert therefor --$\underline{s}_m$--.

Column 8, line 54, after the word "vector", delete "s" and insert therefor --$\underline{s}$--.

Column 8, line 55, before the words "and reordering", delete "$s_m$" and insert therefor --$\underline{s}_m$--.

Column 8, Equation 32, column 1, delete "s" and insert therefor --$\underline{s}$--.

Column 8, line 67, after "$s_{mj}$", delete "demotes" and insert therefor --denotes--.

Column 9, line 1, after the word "stream", delete "$s_m$" and insert therefor --$\underline{s}_m$--.

Column 9, line 2, after the word "vector", delete "s" and insert therefor --$\underline{s}$--.

Column 9, line 3, after the word "producing", delete "$s_{REORDERED}$" and insert therefor --$\underline{s}_{REORDERED}$--.

UNITED STATES PATENT AND TRADEMARK OFFICE
CERTIFICATE OF CORRECTION

PATENT NO. : 7,170,926 B2
APPLICATION NO. : 10/305533
DATED : January 30, 2007
INVENTOR(S) : Ariela Zeria It is certified that error appears in the above-identified patent and that said Letters Patent is hereby corrected as shown below:

Column 9, Equation 33, column 1, delete "$s_{REORDERED}$" and insert therefor --$\underline{s}_{REORDERED}$--.

Column 9, line 16, after the word "vectors", delete "$s_m$" and insert therefor --$\underline{s}_m$--.

Column 9, line 21, after the word "data", delete "d" and insert therefor --$\underline{d}$--.

IN THE CLAIMS

Column 11, line 26, after the word "estimating", delete "a".

Column 12, line 19, after the word "wherein", delete "for".

Signed and Sealed this

Thirteenth Day of May, 2008

JON W. DUDAS
*Director of the United States Patent and Trademark Office*